(12) United States Patent
Palthepu et al.

(10) Patent No.: US 10,270,855 B2
(45) Date of Patent: *Apr. 23, 2019

(54) INTEGRATED CLIENT FOR USE WITH A DISPERSED DATA STORAGE NETWORK

(71) Applicant: CLEVERSAFE, INC., Chicago, IL (US)

(72) Inventors: Srinivas Palthepu, Naperville, IL (US); Vance T. Thornton, Columbus, OH (US); Jesse L. Young, Woodstock, IL (US); John Quigley, Greenwich, CT (US); Andrew Baptist, Mt. Pleasant, WI (US); Greg Dhuse, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 744 days.

This patent is subject to a terminal disclaimer.

(21) Appl. No.: 14/628,817

(22) Filed: Feb. 23, 2015

(65) Prior Publication Data

US 2015/0172386 A1    Jun. 18, 2015

Related U.S. Application Data

(63) Continuation of application No. 12/649,099, filed on Dec. 29, 2009, now Pat. No. 8,965,956, which is a
(Continued)

(51) Int. Cl.
*H04L 29/08* (2006.01)
*G06F 17/30* (2006.01)

(52) U.S. Cl.
CPC .... *H04L 67/1097* (2013.01); *G06F 17/30194* (2013.01)

(58) Field of Classification Search
None
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Wikipedia, Port(computer networking), p. 1-5, printed Sep. 11, 2017.*

(Continued)

*Primary Examiner* — Backhean Tiv
(74) *Attorney, Agent, or Firm* — Garlick & Markison; Timothy W. Markison; Harry S. Tyson, Jr.

(57) ABSTRACT

A method with a computer generating a first set of access requests regarding a first set of encoded data slices and storage units of a dispersed storage network. A first data segment is encoded into the first set of encoded data slices. The method continues with the computer generating a second set of access requests regarding a second set of encoded data slices and the storage units. A second data segment is encoded into the second set of encoded data slices. The method continues with the computer grouping the first set of access requests and the second set of access requests to produce a set of combined requests. The method continues with the computer sending the set of combined requests to the storage units.

16 Claims, 16 Drawing Sheets

Related U.S. Application Data continuation-in-part of application No. 11/973,621, filed on Oct. 9, 2007, now Pat. No. 7,904,475, and a continuation-in-part of application No. 12/218,200, filed on Jul. 14, 2008, now Pat. No. 8,209,363, which is a continuation-in-part of application No. 11/973,613, filed on Oct. 9, 2007, now Pat. No. 8,285,878.

(60) Provisional application No. 61/141,534, filed on Dec. 30, 2008.

(56) References Cited

U.S. PATENT DOCUMENTS

| | | | |
|---|---|---|---|
| 5,485,474 A * | 1/1996 | Rabin | G06F 11/004 714/762 |
| 5,517,632 A * | 5/1996 | Matsumoto | G06F 3/0601 711/114 |
| 5,644,697 A * | 7/1997 | Matsumoto | G06F 3/0601 711/114 |
| 5,701,407 A * | 12/1997 | Matsumoto | G06F 3/0601 714/6.32 |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,219,045 B1 * | 4/2001 | Leahy | H04W 4/029 715/757 |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,496,944 B1 * | 12/2002 | Hsiao | G06F 11/1435 714/15 |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 6,931,501 B1 * | 8/2005 | Narayanaswamy | G06F 3/0613 710/32 |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Raiford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,461 B1 * | 12/2006 | Kiselev | G06F 11/1076 711/114 |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 * | 12/2009 | de la Torre | H03M 7/30 |
| 7,904,475 B2 * | 3/2011 | Gladwin | G06F 17/30067 707/781 |
| 8,171,101 B2 * | 5/2012 | Gladwin | H04L 67/1097 370/242 |
| 8,171,102 B2 * | 5/2012 | Gladwin | H04L 67/1097 370/352 |
| 8,209,363 B2 * | 6/2012 | Palthepu | G06F 17/30106 707/652 |
| 8,239,535 B2 * | 8/2012 | Error | H04L 67/1002 707/769 |
| 8,285,878 B2 * | 10/2012 | Gladwin | G06F 3/0617 709/203 |
| 8,352,782 B2 * | 1/2013 | Thornton | G06F 11/1076 714/6.22 |
| 8,464,096 B2 * | 6/2013 | Thornton | G06F 11/1076 714/6.24 |
| 8,560,882 B2 * | 10/2013 | Thornton | G06F 11/1076 714/6.24 |
| 8,954,667 B2 * | 2/2015 | Dhuse | H04L 67/1097 711/114 |
| 8,965,956 B2 * | 2/2015 | Palthepu | H04L 67/1097 709/203 |
| 9,141,297 B2 * | 9/2015 | Resch | G06F 3/0619 |
| 9,154,298 B2 * | 10/2015 | Resch | G06F 21/6272 |
| 9,274,864 B2 * | 3/2016 | Baptist | H04L 9/085 |
| 9,298,542 B2 * | 3/2016 | Peake | G06F 11/10 |
| 9,430,336 B2 * | 8/2016 | Motwani | G06F 3/0617 |
| 9,552,261 B2 * | 1/2017 | Resch | G06F 11/1464 |
| 9,632,872 B2 * | 4/2017 | Dhuse | G06F 11/1088 |
| 9,727,266 B2 * | 8/2017 | Resch | H04L 63/101 |
| 2002/0062422 A1 | 5/2002 | Butterworth et al. | |
| 2002/0145424 A1 * | 10/2002 | Uetake | G01R 33/56563 324/307 |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0117718 A1 * | 6/2004 | Manasse | H03M 13/1515 714/781 |
| 2004/0122917 A1 | 6/2004 | Menon et al. | |
| 2004/0148454 A1 * | 7/2004 | Seo | G06F 3/0613 711/100 |
| 2004/0215998 A1 | 10/2004 | Buxton et al. | |
| 2004/0228493 A1 | 11/2004 | Ma | |
| 2005/0080920 A1 * | 4/2005 | Bender | G06F 9/546 709/236 |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0144514 A1 * | 6/2005 | Ulrich | G06F 3/061 714/6.12 |
| 2005/0229069 A1 | 10/2005 | Hassner et al. | |
| 2006/0047907 A1 | 3/2006 | Shiga et al. | |
| 2006/0048206 A1 * | 3/2006 | Fdida | H04L 29/06 725/135 |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0143359 A1 * | 6/2007 | Uppala | G06F 11/1004 |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2008/0002689 A1 * | 1/2008 | Vera | H04M 7/0057 370/389 |
| 2008/0263113 A1 * | 10/2008 | Krishnaiyer | G06F 17/30138 |
| 2009/0094250 A1 * | 4/2009 | Dhuse | G06F 11/1004 |
| 2009/0094251 A1 * | 4/2009 | Gladwin | G06F 17/30067 |
| 2009/0094318 A1 * | 4/2009 | Gladwin | H04L 67/1097 709/203 |

(56) References Cited

U.S. PATENT DOCUMENTS

| | | | |
|---|---|---|---|
| 2009/0094320 A1* | 4/2009 | Palthepu | G06F 17/30194 709/203 |
| 2010/0023524 A1 | 1/2010 | Gladwin et al. | |
| 2010/0169391 A1* | 7/2010 | Baptist | G06F 17/30126 707/827 |
| 2010/0169415 A1* | 7/2010 | Leggette | G06F 17/30194 709/203 |
| 2010/0169500 A1* | 7/2010 | Quigley | G06F 17/30194 709/229 |
| 2010/0217796 A1* | 8/2010 | Palthepu | G06F 17/30194 709/203 |
| 2011/0072115 A1* | 3/2011 | Gladwin | G06F 3/0617 709/219 |
| 2013/0275833 A1* | 10/2013 | Thornton | G06F 11/1076 714/764 |
| 2014/0310310 A1* | 10/2014 | Resch | G06F 3/0617 707/770 |
| 2015/0172386 A1* | 6/2015 | Palthepu | G06F 17/30194 709/219 |
| 2017/0075762 A1* | 3/2017 | Hendrickson | G06F 3/0619 |

OTHER PUBLICATIONS

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Technical Specification Road Map; IETF Network Working Group; RFC 4510; Jun. 2006; pp. 1-8.

Xin, et al.; Evaluation of Distributed Recovery in Large-Scale Storage Systems; 13th IEEE International Symposium on High Performance Distributed Computing; Jun. 2004; pp. 172-181.

Wildi; Java iSCSi Initiator; Master Thesis; Department of Computer and Information Science, University of Konstanz; Feb. 2007; 60 pgs.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Shamir; How to Share a Secret; Communications of the ACM; vol. 22, No. 11; Nov. 1979; pp. 612-613.

Sermersheim; Lightweight Directory Access Protocol (LDAP): The Protocol; IETF Network Working Group; RFC 4511; Jun. 2006; pp. 1-68.

Sciberras; Lightweight Directory Access Protocol (LDAP): Schema for User Applications; IETF Network Working Group; RFC 4519; Jun. 2006; pp. 1-33.

Satran, et al.; Internet Small Computer Systems Interface (iSCSI); IETF Network Working Group; RFC 3720; Apr. 2004; pp. 1-257.

Rabin; Efficient Dispersal of Information for Security, Load Balancing, and Fault Tolerance; Journal of the Association for Computer Machinery; vol. 36, No. 2; Apr. 1989; pp. 335-348.

Plank, T1: Erasure Codes for Storage Applications; FAST2005, 4th Usenix Conference on File Storage Technologies; Dec. 13-16, 2005; pp. 1-74.

Legg; Lightweight Directory Access Protocol (LDAP): Syntaxes and Matching Rules; IETF Network Working Group; RFC 4517; Jun. 2006; pp. 1-50.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Harrison; Lightweight Directory Access Protocol (LDAP): Authentication Methods and Security Mechanisms; IETF Network Working Group; RFC 4513; Jun. 2006; pp. 1-32.

Chung; An Automatic Data Segmentation Method for 3D Measured Data Points; National Taiwan University; pp. 1-8; 1998.

Communication pursuant to Article 94(3) EPC; EP Application No. 08837609.0-1954; dated May 12, 2017; 7 pages.

* cited by examiner

INTEGRATED CLIENT FOR USE WITH A DISPERSED DATA STORAGE NETWORK

CROSS-REFERENCE TO RELATED APPLICATIONS

The present U.S. Utility Patent Application claims priority pursuant to 35 U.S.C. § 120 as a continuation of U.S. Utility application Ser. No. 12/649,099, entitled "INTEGRATED CLIENT FOR USE WITH A DISPERSED DATA STORAGE NETWORK", filed Dec. 29, 2009, issuing on Feb. 24, 2015 as U.S. Pat. No. 8,965,956, which claims priority pursuant to 35 U.S.C. § 119(e) to U.S. Provisional Application No. 61/141,534, entitled "INTEGRATED CLIENT FOR USE WITH A DISPERSED DATA STORAGE NETWORK", filed Dec. 30, 2008, all of which are hereby incorporated herein by reference in their entirety and made part of the present U.S. Utility Patent Application for all purposes.

U.S. Utility application Ser. No. 12/649,099 also claims priority pursuant to 35 U.S.C. § 120 as a continuation-in-part of U.S. Utility application Ser. No. 11/973,621, entitled "VIRTUALIZED DATA STORAGE VAULTS ON A DISPERSED DATA STORAGE NETWORK", filed Oct. 9, 2007, now U.S. Pat. No. 7,904,475, issued on Mar. 8, 2011, and U.S. Utility application Ser. No. 12/218,200 entitled "FILE SYSTEM ADAPTED FOR USE WITH A DISPERSED DATA STORAGE NETWORK", filed Jul. 14, 2008, now U.S. Pat. No. 8,209,363, issued on Jun. 26, 2012, which is a continuation-in-part of U.S. Utility application Ser. No. 11/973,613, entitled "BLOCK BASED ACCESS TO A DISPERSED DATA STORAGE NETWORK", filed Oct. 9, 2007, now U.S. Pat. No. 8,285,878, issued on Oct. 9, 2012, all of which are hereby incorporated herein by reference in their entirety and made part of the present U.S. Utility Patent Application for all purposes.

The following application is also incorporated by reference in its entirety:
1. U.S. Utility application Ser. No. 11/973,622, entitled "SMART ACCESS TO A DISPERSED DATA STORAGE NETWORK", filed Oct. 9, 2007, now U.S. Pat. No. 8,171,101, issued on May 1, 2012.

FIELD OF THE INVENTION

The present invention relates generally to systems, apparatus, and methods for distributed data storage, and more particularly to systems, apparatus, and methods for distributed data storage using an information dispersal algorithm so that no one location will store an entire copy of stored data, and more particularly still to systems, apparatus, and methods for accessing a dispersed data storage network using a single integrated client.

DESCRIPTION OF THE PRIOR ART

Storing data in digital form is a well-known problem associated with all computer systems, and numerous solutions to this problem are known in the art. The simplest solution involves merely storing digital data in a single location, such as a punch film, hard drive, or FLASH memory device. However, storage of data in a single location is inherently unreliable. The device storing the data can malfunction or be destroyed through natural disasters, such as a flood, or through a malicious act, such as arson. In addition, digital data is generally stored in a usable file, such as a document that can be opened with the appropriate word processing software, or a financial ledger that can be opened with the appropriate spreadsheet software. Storing an entire usable file in a single location is also inherently insecure as a malicious hacker only need compromise that one location to obtain access to the usable file.

To address reliability concerns, digital data is often "backed-up," i.e., an additional copy of the digital data is made and maintained in a separate physical location. For example, a backup tape of all network drives may be made by a small office and maintained at the home of a trusted employee. When a backup of digital data exists, the destruction of either the original device holding the digital data or the backup will not compromise the digital data. However, the existence of the backup exacerbates the security problem, as a malicious hacker can choose between two locations from which to obtain the digital data. Further, the site where the backup is stored may be far less secure than the original location of the digital data, such as in the case when an employee stores the tape in their home.

Another method used to address reliability and performance concerns is the use of a Redundant Array of Independent Drives ("RAID"). RAID refers to a collection of data storage schemes that divide and replicate data among multiple storage units. Different configurations of RAID provide increased performance, improved reliability, or both increased performance and improved reliability. In certain configurations of RAID, when digital data is stored, it is split into multiple stripes, each of which is stored on a separate drive. Data striping is performed in an algorithmically certain way so that the data can be reconstructed. While certain RAID configurations can improve reliability, RAID does nothing to address security concerns associated with digital data storage.

One method that prior art solutions have addressed security concerns is through the use of encryption. Encrypted data is mathematically coded so that only users with access to a certain key can decrypt and use the data. Common forms of encryption include DES, AES, RSA, and others. While modern encryption methods are difficult to break, numerous instances of successful attacks are known, some of which have resulted in valuable data being compromised.

Files are usually organized in file systems, which are software components usually associated with an operating system. Typically, a file system provides means for creating, updating, maintaining, and hierarchically organizing digital data. A file system accepts digital data of arbitrary size, segments the digital data into fixed-size blocks, and maintains a record of precisely where on the physical media data is stored and what file the data is associated with. In addition, file systems provide hierarchical directory structures to better organize numerous files.

Various interfaces to storage devices are also well known in the art. For example, Small Computer System Interface ("SCSI") is a well known family of interfaces for connecting and transferring data between computers and peripherals, including storage. There are also a number of standards for transferring data between computers and storage area networks ("SAN"). For example, Fibre Channel is a networking technology that is primarily used to implement SANs. Fibre Channel SANS can be accessed through SCSI interfaces via Fibre Channel Protocol ("FCP"), which effectively bridges Fibre Channel to higher level protocols within SCSI. Internet Small Computer System Interface ("iSCSI"), which allows the use of the SCSI protocol over IP networks, is an alternative to FCP, and has been used to implement lower cost SANs using Ethernet instead of Fibre Channel as the physical connection. Interfaces for both FCP and iSCSI are available for many different operating systems, and both protocols are widely used. The iSCSI standard is described in "Java iSCSI Initiator," by Volker Wildi, and Internet Engineering Task Force RFC 3720, both of which are hereby incorporated by reference.

In 1979, two researchers independently developed a method for splitting data among multiple recipients called "secret sharing." One of the characteristics of secret sharing is that a piece of data may be split among n recipients, but cannot be known unless at least t recipients share their data, where n≥t. For example, a trivial form of secret sharing can be implemented by assigning a single random byte to every recipient but one, who would receive the actual data byte after it had been bitwise exclusive orred with the random bytes. In other words, for a group of four recipients, three of the recipients would be given random bytes, and the fourth would be given a byte calculated by the following formula:

$$s'=s \oplus r_a \oplus r_b \oplus r_c,$$

where s is the original source data, $r_a$, $r_b$, and $r_c$ are random bytes given to three of the four recipients, and s' is the encoded byte given to the fourth recipient. The original byte s can be recovered by bitwise exclusive-orring all four bytes together.

The problem of reconstructing data stored on a digital medium that is subject to damage has also been addressed in the prior art. In particular, Reed-Solomon and Cauchy Reed-Solomon coding are two well-known methods of dividing encoded information into multiple slices so that the original information can be reassembled even if all of the slices are not available. Reed-Solomon coding, Cauchy Reed-Solomon coding, and other data coding techniques are described in "Erasure Codes for Storage Applications," by Dr. James S. Plank, which is hereby incorporated by reference.

Traditional disk-oriented file systems offer the ability to store and retrieve user-visible files, directories and their metadata. In addition to this data, and transparent to the file system user, is the file system metadata which is comprised of various elements of concern to the file system itself or its immediate execution context of the operating system kernel. File system metadata (often called the superblock in UNIX parlance) is composed of such things as the magic number identifying the file system, vital numbers describing geometry, statistics and behavioral tuning parameters and a pointer to the tree's root. This has various implications, the most crucial of which being that a file system cannot "bootstrap" itself, or bring itself online, if the superblock were to ever become corrupt.

Schemes for implementing dispersed data storage networks ("DDSNs"), which are also known as dispersed data storage grids, are also known in the art. In particular, U.S. Pat. No. 5,485,474, issued to Michael O. Rabin, describes a system for splitting a segment of digital information into n data slices, which are stored in separate devices. When the data segment must be retrieved, only m of the original data slices are required to reconstruct the data segment, where n>m.

Cleversafe, Inc. of Chicago, Ill. has released a number of products providing users with DDSN storage solutions. These products make use of a grid access computer through which client computers can access slice servers that store data. The use of a grid access computer allows for network file system interfaces to be easily abstracted, and, using Cleversafe's recently developed gateway technology, a number of different access protocols can be made available using a single grid access computer. However, any device that needs to access data stored on the DDSN must have access to the grid access computer. This can be inconvenient for enterprises that wish to provide access to mobile users or home users, as the grid access computer must be placed outside of an installation's firewall.

OBJECTS OF THE INVENTION

Accordingly, it is an object of this invention to provide a system, apparatus, and method for accessing a dispersed data storage network using an integrated client, wherein all software required to read and write data to the dispersed data storage network is contained on the client.

Another object of the invention is to provide a system, apparatus, and method for accessing a dispersed data storage network using file transfer protocol commands.

Other advantages of the disclosed invention will be clear to a person of ordinary skill in the art. It should be understood, however, that a system, method, or apparatus could practice the disclosed invention while not achieving all of the enumerated advantages, and that the protected invention is defined by the claims.

SUMMARY OF THE INVENTION

The disclosed invention achieves its objectives by providing an integrated client computer for accessing a dispersed data storage network. In one embodiment, the client computer includes a network port adaptively coupled to a network in communication with a plurality of slice servers comprising a dispersed data storage network. A client program operates on the client computer and receives commands directly or indirectly from a user. For example, the client program may receive a command to read a data segment, in which case, the client program will transmit network messages to at least m slice servers, where m is the minimum number of data slices required to assemble a data segment stored on the dispersed data storage network. The client program then receives at least m data slices using the network port, and reassembles the requested data segment using an information dispersal algorithm. In another example, the client program may receive a command to write a data segment to the dispersed data storage network, in which case, the client program will apply an information dispersal algorithm to the data segment and generate n data slices, where n is the number of data slices that are stored on the dispersed data storage network corresponding to a data segment. After "slicing" the data segment into n data slices, the client program will write the data slices to n slice servers. In a further embodiment, the client program may accept commands using FTP ("File Transfer Protocol") syntax.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE ILLUSTRATED EMBODIMENT

Figure 1:
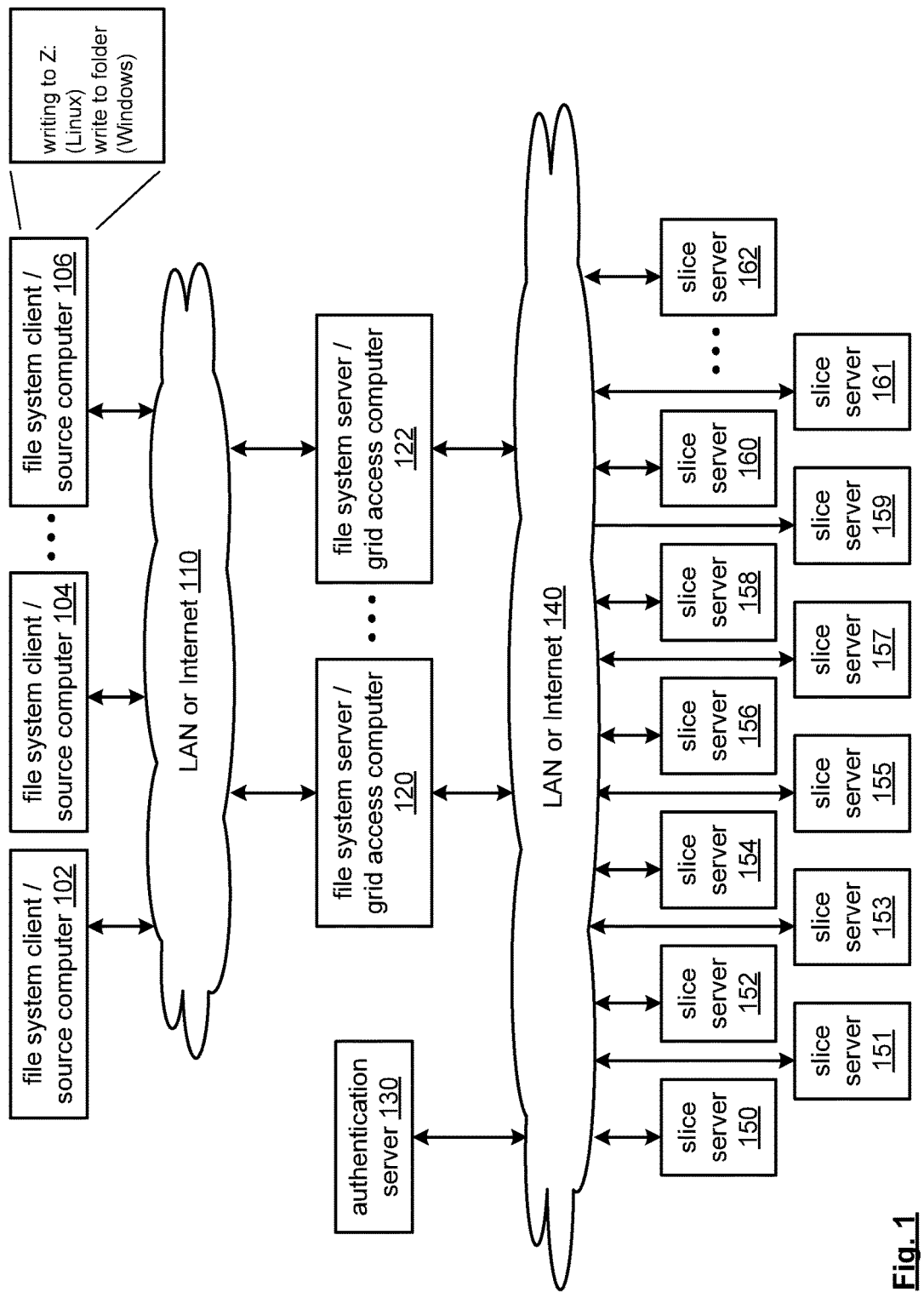
FIG. 1 is a network diagram of a dispersed data storage network constructed in accordance with an embodiment of the disclosed invention.

Turning to the Figures, and to FIG. 1 in particular, a distributed computer system implementing a dispersed data storage network 100 is shown. An arbitrary number of slice servers 150-162 store data slices sent to them by networked source computers 102, 104, and 106. As illustrated, some number of grid access computers 120 and 122 serve as networked iSCSI Targets for an arbitrary number of source computers 102,104,106, which are configured as iSCSI Initiators.

As explained herein, the disclosed invention allows a dispersed data storage network to be presented as a block device which can be mounted as a network drive by compatible operating systems. As illustrated, the dispersed data storage network is accessed by the source computers 102, 104, and 106, as an iSCSI Target. In particular, each source computer 102, 104, 106 writes data blocks to an iSCSI Initiator, which forms network commands that are directed to an associated iSCSI Target, which is in this case implemented on grid access computers 120 and 122. Note that an iSCSI Target could be implemented on the source computers 102, 104, and 106, which would make the grid access computers 120,122 unnecessary. In addition, a different storage protocol, such as FCP or ATA over Ethernet could be used, or a device driver could be implemented directly on the source computers 102, 104, and 106 to present the dispersed data storage network as a mounted drive. The iSCSI implementation discussed herein is only used as a device to aid the understanding of the disclosed invention by a person of ordinary skill in the art.

Figure 2:
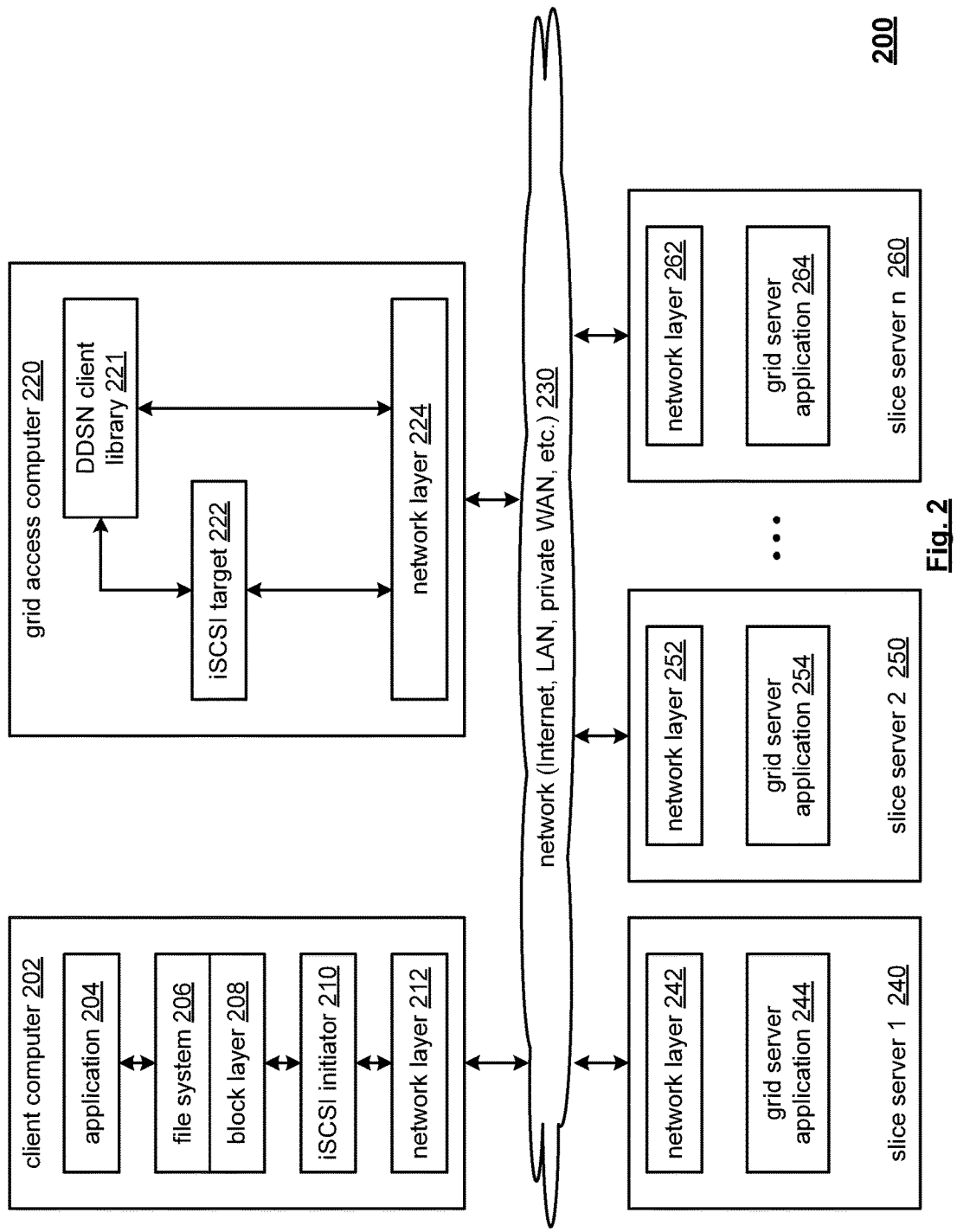
FIG. 2 is a block diagram illustrating the interoperation of different software components used to implement a dispersed data storage network constructed in accordance with an embodiment of the disclosed invention.

FIG. 2 illustrates a distributed computer system implementing a dispersed data storage network 200. The illustrated system consists of a client/user computer 202, a grid access computer 220, and some number of slice servers 240, 250, and 260. Within the client computer 202 an application program 204 accesses an operating system including a file system 206. The operating system may include a separate block layer 208, meaning an interface to block devices such as storage device drivers, or the functionality of the block layer 208 may be incorporated into the file system 206. In either case, read and write commands directed to the file system are forwarded to an iSCSI Initiator 210, which formulates network commands that are carried out by a network layer 212, which is also part of the operating system operating on the client computer 202.

As illustrated, the iSCSI Initiator 210 operating on the client computer 202 is configured to operate with iSCSI Target 222, resident on grid access computer 220. The iSCSI Target 222 receives network commands from the iSCSI Initiator 210 via a separate network layer 224 operating on the grid access computer 220. As opposed to a standard iSCSI Target, which would merely store data on one or more drives accessible to the iSCSI Target, the iSCSI Target 222 operating on the grid access computer 220 is configured to operate with a dispersed data storage network. As will be explained in more detail in the sections that follow, the iSCSI Target 222 communicates with DDSN Client Library 221, which implements a data dispersal algorithm in accordance with the commands received from the iSCSI Initiator 210, and either retrieves data from appropriate slice servers 240, 250, and 260 or writes data to the same. Each slice server 240, 250, and 260 also contains a grid server application 244, 254, and 264 that stores and retrieves data slices in accordance with network commands received from the grid access computer 220 via the network layers 242, 252, and 262 of the respective slice servers 240, 250, and 260.

Figure 3:
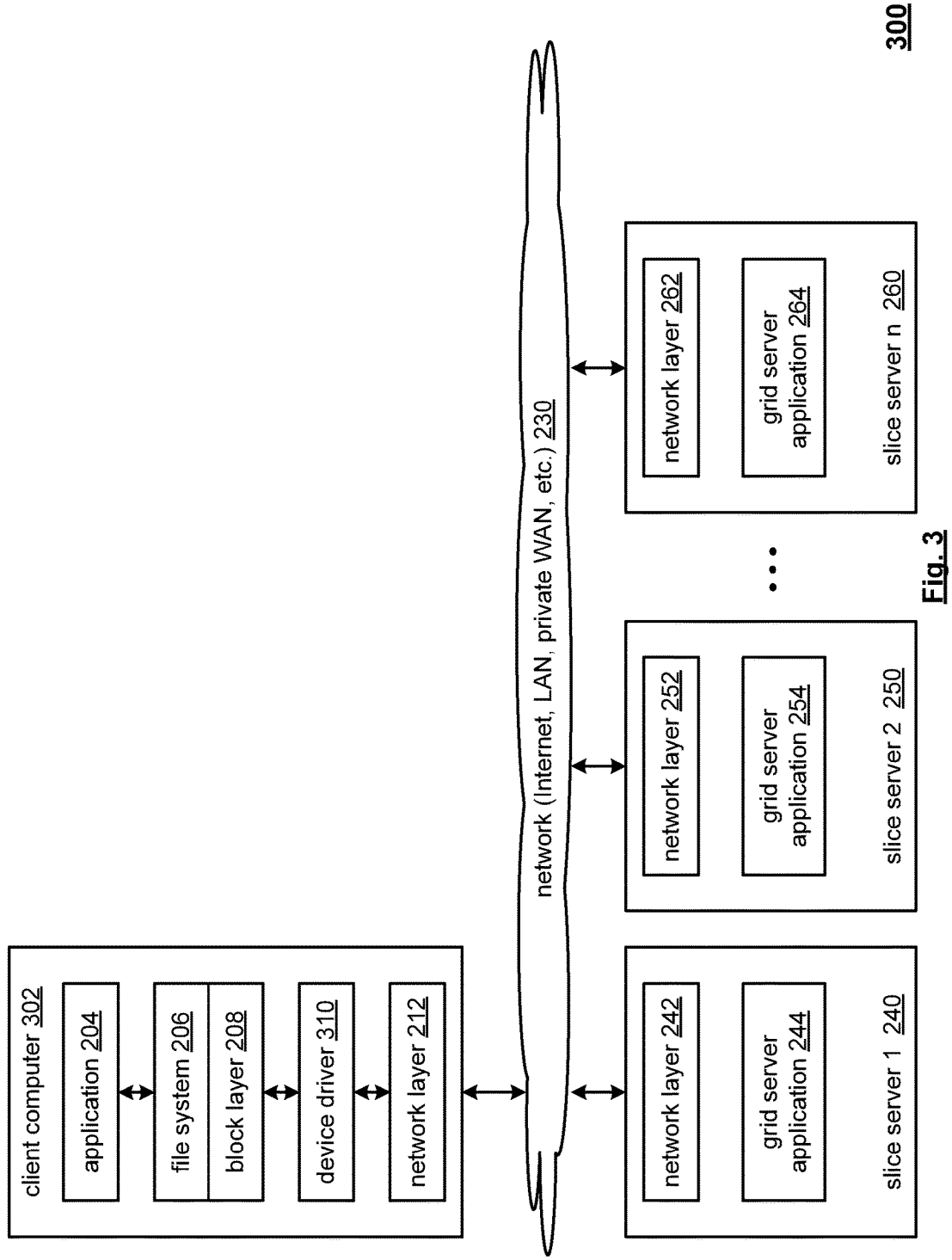
FIG. 3 is a block diagram illustrating the interoperation of different software components used to implement a dispersed data storage network constructed in accordance with a different embodiment of the disclosed invention.

FIG. 3 illustrates a slightly different distributed computer system implementing a dispersed data storage network 300. The illustrated system is identical to that shown in FIG. 2, except that the grid access computer 220 has been entirely removed, and, instead of using an iSCSI Target 222 to implement a block interface to the dispersed data storage network, a device driver 310 resident on the client user computer 302 implements the block interface. In this implementation, the device driver 310 receives read and write commands from the file system 206. The device driver 310 is configured to fulfill read and write commands through the dispersed data storage network 240, 250, and 260. Like the iSCSI Target 222 of the previously discussed implementation, the device driver 310 implements a data dispersal algorithm in accordance with the commands received from the file system 206, and either retrieves data from appropriate slice servers 240, 250, and 260 or writes data to the same. The embodiment of FIG. 3 is otherwise similar to that of FIG. 2.

Figure 4:
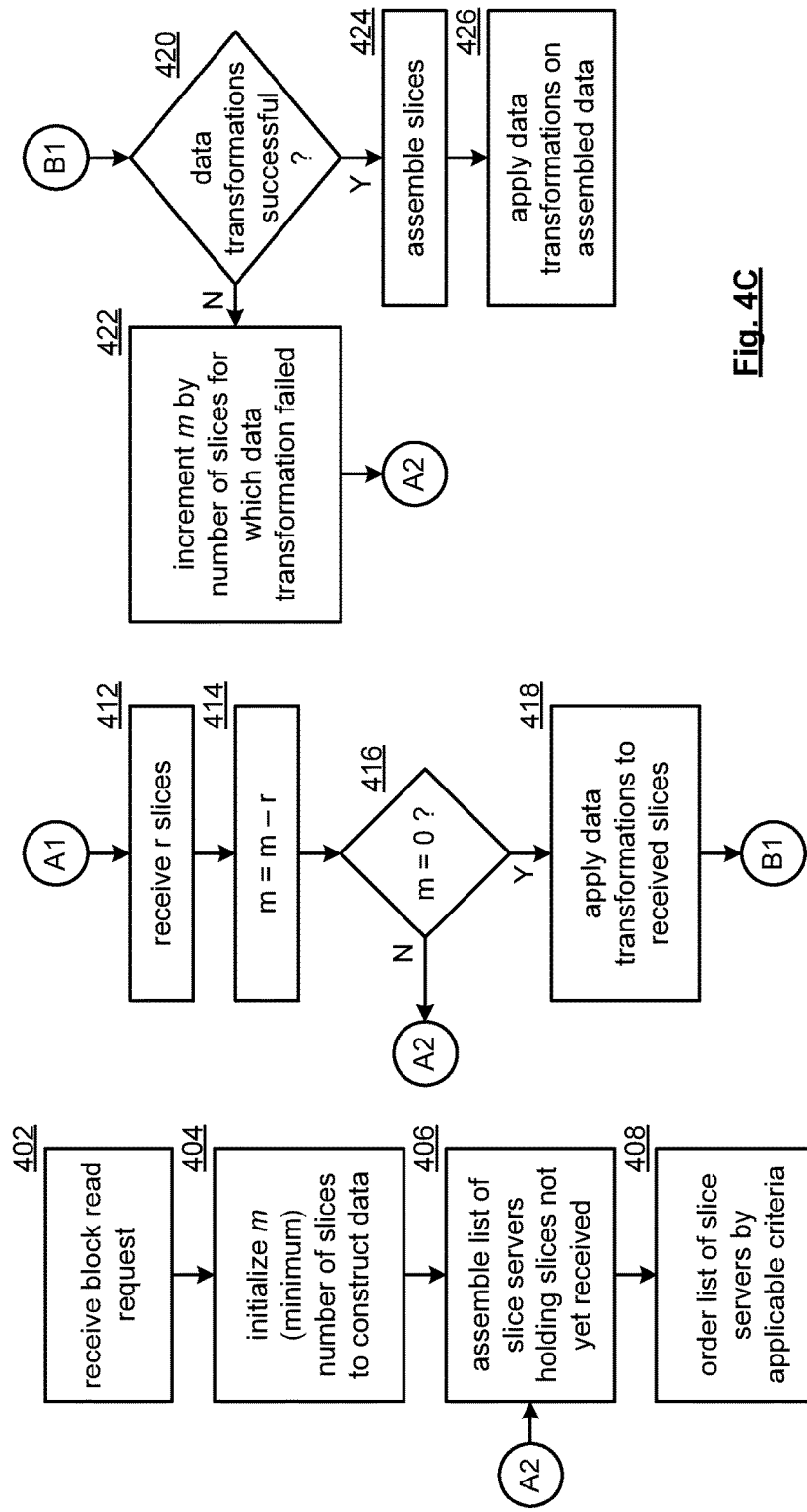
FIGS. 4A-4C collectively illustrate a read operation from a dispersed data storage network constructed in accordance with an embodiment of the disclosed invention.

FIGS. 4A-4C show the process by which an iSCSI Target, or other data dispersal/assembly software component, constructed in accordance with the disclosed invention, could handle a read request. In step 402, a read request is received. Contained within the read request will be information sufficient to determine which slice servers contain applicable data, as well as the minimum number of data slices that must be retrieved before the requested data can be reconstructed. Further information on one method that can be used to associate data requests with particular slice servers is contained in U.S. patent application Ser. No. 11/973,621, titled "Virtualized Data Storage Vaults on a Dispersed Data Storage Network," filed on Oct. 9, 2007, patented on Mar. 8, 2011, as U.S. Pat. No. 7,904,475, assigned to Cleversafe, Inc., and hereby incorporated by reference in its entirety. In step 404, the variable m is initialized to the minimum number of slices required to construct the requested data. As described herein, for each successfully received and validated slice, m is decremented.

In step 406, a list of slice servers each holding one required data slice that has yet to be received is assembled, and in step 408, the list is ordered by any applicable criteria. Further information on criteria by which the list may be ordered is contained in U.S. patent application Ser. No. 11/973,622, titled "Smart Access to a Dispersed Data Storage Network," filed on Oct. 9, 2007, patented on May 1, 2012 as U.S. Pat. No. 8,171,101, assigned to Cleversafe, Inc., and hereby incorporated by reference in its entirety. In step 410, read requests are issued to the first k slice servers on the assembled list, where k is at least equal to m, the minimum number of data slices needed to reconstruct the requested data segment, but could be as large as n, the number of data slices that have data relevant to the requested data segment. In step 412, r data slices are received, and in step 414 the number of received data slices r is subtracted from the variable m. Note that the number of received data slices r may be smaller than the number of requested data slices k. In step 416, m is compared to zero, and if m is not equal to zero, execution returns to step 406, and execution proceeds as normal from there. However, if m is equal to zero, a collection of data transformations may optionally be applied to the received slices in step 418. The applied data transformations can include decryption, decompression, and integrity checking. For example, each data slice may have a cyclical redundancy check ("CRC"), or other form of checksum appended to the data contained in the slice. This checksum could be compared against a checksum calculated against the received data to ensure that the data was not corrupted while it was stored or during the transmission process.

In step 420, it is determined if the applied data transformations were successful for all of the received data slices. If the applied data transformations were not successful for some of the received slices, m is incremented by this number in step 422, and execution is resumed at step 406. The data transformations could fail, for example, if an integrity check revealed that a received data slice may be corrupted. However, if the applied data transformations were successful for all received data slices, the received slices are assembled into the requested block of data in step 424. The same or different data transformations may optionally be applied to the assembled data block in step 426, which completes the read process.

Figure 5:
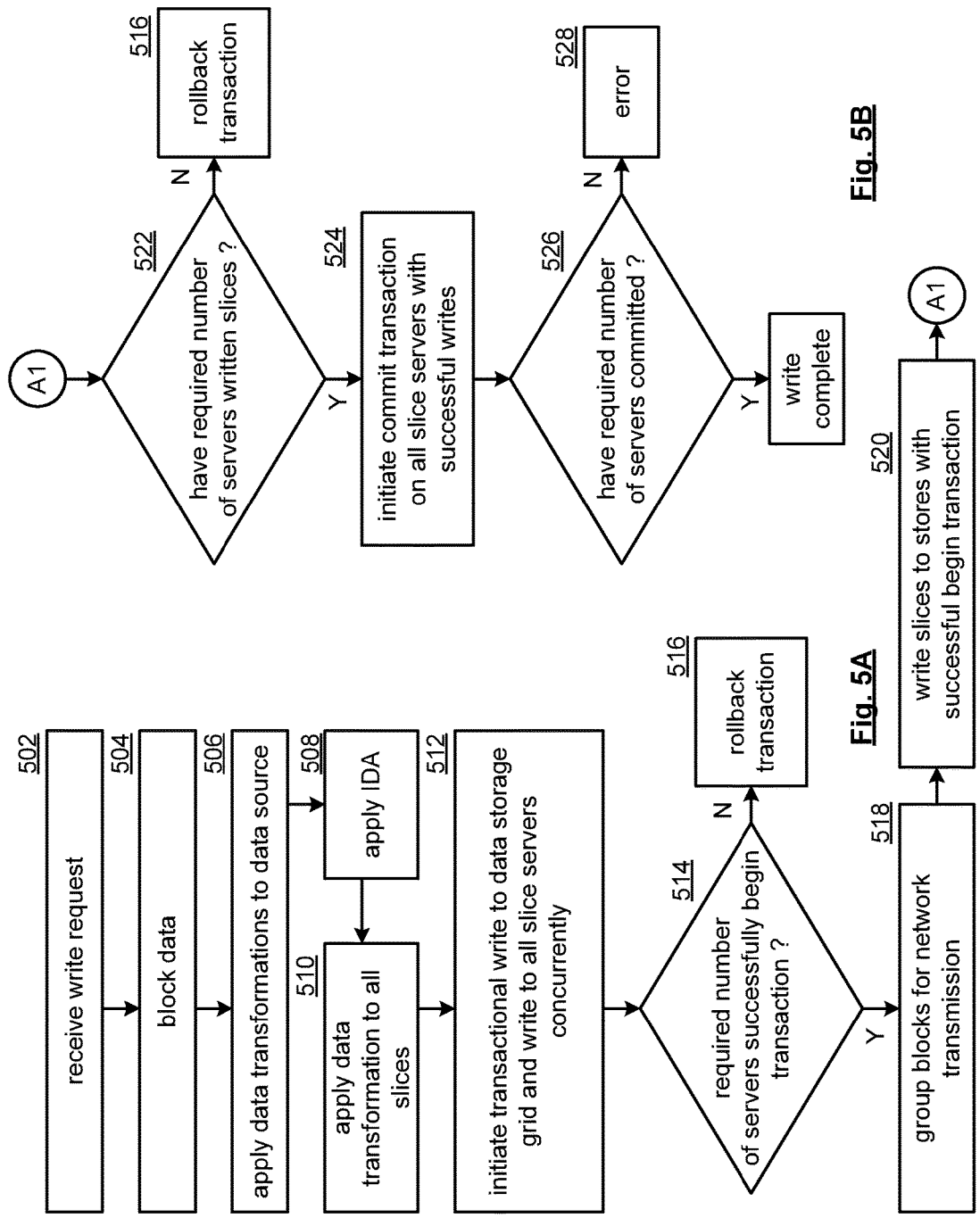
FIGS. 5A-5B collectively illustrate a write operation from a dispersed data storage network constructed in accordance with an embodiment of the disclosed invention.

In FIGS. 5A-5B, the process by which an iSCSI Target, or other data dispersal/assembly software component, constructed in accordance with the disclosed invention, could handle a write request is illustrated. In step 502, a write request is received. Included in this write request is a data segment to be written that could span many fixed length blocks. In addition, the write request will contain information sufficient to determine which slice servers the data segment should be written to, as well as information required by the information dispersal algorithm to slice each block, i.e., the number of slices to be written, referred to as n, as well as the minimum number of slices that are required to recover the data, referred to as m. Further information on one method that can be used to associate data writes with particular slice servers is contained in U.S. patent application Ser. No. 11/973,621, titled "Virtualized Data Storage Vaults on a Dispersed Data Storage Network," filed on Oct. 9, 2007, patented on Mar. 8, 2011, as U.S. Pat. No. 7,904,475, and assigned to Cleversafe, Inc.

In step 504, the data segment is blocked into identical length fixed-size blocks. A number of data transformations may optionally be applied to each block in step 506, and an information dispersal algorithm is applied in step 508. In particular, the Cauchy Reed-Solomon dispersal algorithm could be applied to each block, resulting in a predetermined number of data slices. In step 510, a number of data transformations are optionally applied to each data slice.

In the disclosed system, writes are performed transactionally, meaning that all data slices must be successfully written before a write is deemed complete. In step 512, a write transaction is initiated to the data storage network. As discussed herein, all slice servers are simultaneously contacted, and in step 514, a confirmation that at least n receiving slice servers are prepared to begin the write transaction must be received, or the transaction is rolled back in step 516.

In step 518, blocks are grouped for transmission, and in step 520 data slices are transmitted to the slice servers that indicated their ability to receive and store slices. The number of slice servers that successfully received and stored their assigned data slices is checked in step 522, and if less than n slices are successfully stored, the transaction is rolled back in step 516. In step 524, a commit transaction is begun on all servers with successful writes. If the commit transaction fails, an error is logged in step 528.

Detailed Description of the Improved File System Adapted for Use with a Dispersed Data Storage Network In addition to the block based interface described above, a dispersed data storage network could also be accessed through a specially designed file interface. The file interface disclosed below is especially designed to access a dispersed data storage network ("DDSN"), and preserves the advantages of the disclosed block based interface while providing a number of further advantages. The block based iSCSI interface is limited by the client initiator in terms of number of concurrent requests, caching behavior and handling of multiple users (both readers and writers). The file interface does not face these restrictions and can potentially provide better performance and allow multiple usage. Additionally, the same vault could be accessed from a variety of types of clients, such as smart phones or applets, as well as traditional desktop machines. Further, to aid in user adoption, the disclosed DDSN file interface could be provided as a virtual file system interface, and higher level interfaces to commonly used network file systems, such as NFS, CIFS, WebDAV and FTP, could be provided. In such an implementation, a user would notice little or no difference when accessing the DDSN than when accessing a file stored on her local drive.

The disclosed File/Object implementation dispenses of the need for file system metadata, while still maintaining the flexibility that file system metadata grants. This is achieved through clean separation of the file system representation logic (as implemented by File/Object) and the file system storage, as implemented by a quantity of slice servers. In one embodiment, this separation allows two key assumptions to be made regarding the data format of information stored on the DDSN without concern for the efficiency or durability of that format.

First, as all stored data is associated with a file vault, it can be assumed that the data source identifier for the root object associated a particular file value is fixed across the entire vault. As a result, the file-object layer is not required to consult any on-disk reference to determine where a particular file system object resides or what other objects reference it.

Second, all data source identifiers are large, randomly generated, numbers, such as a Universally Unique Identifier, as opposed to monotonically increasing references used in traditional file systems. Traditional file systems use monotonically increasing references as they allow for near instantaneous look-up of data related to an identified file when combined with traditional look-up table structures. However, for a file system especially adapted for use with a dispersed data storage network, the use of a random identifier relieves the File-Object system from having to track allocated and free identifiers, which is typically achieved through the use of a "bookkeeping" bit mask. This allows for the flexible increase or decrease of space allocated to a particular vault at any time, as there are no assumptions about the allocation of size at the time that a vault is created.

One feature of the disclosed DDSN File System ("DFS") is that it provides for the caching of directory objects and file system metadata. This provides a significant increase in performance and a significant decrease in network traffic; for instance, routine file system accesses do not require a directory object to be read from the DDSN multiple times, thereby allowing near instantaneous access after the directory is read the first time, and eliminating additional packets that would have resulted from reading the directory object from the DDSN multiple times. Depending on the implementation of the particular DDSN, a file system cache could reside on each client computer, or a grid access computer could maintain a file system cache for a plurality of client computers. Note that only file system objects, such as directory objects and file system metadata (i.e., metadata associated with directory objects and file objects), are cached; actual file data is not cached by the disclosed file system. Further note that file system metadata refers to data that describes a particular directory or file, such as the date and time that the referenced directory or file was last modified.

Another feature of the disclosed DFS is that all operations, including create operations, read operations, update operations, and delete operations, are performed transactionally, meaning that every step of an operation is verified before it is deemed complete, and any failed operation is "rolled back." For example, when an update operation for a particular data segment is performed, every updated data slice associated with the updated data segment must be written before the update transaction is deemed complete. Otherwise, the update transaction fails, and is rolled back, thereby preventing potential corruption of data stored on the DDSN.

In addition, while this application discusses DFS accesses in a unitary manner, accesses of multiple segments within a file could occur concurrently based on the capabilities of a particular grid client. For example, a powerful grid client with ample bandwidth and memory to store data could read or write multiple data segments in a single message and could utilize multiple threads or processes to perform such reads or writes. This would better utilize the network bandwidth and greatly increase performance in a high latency environment.

Figure 6:
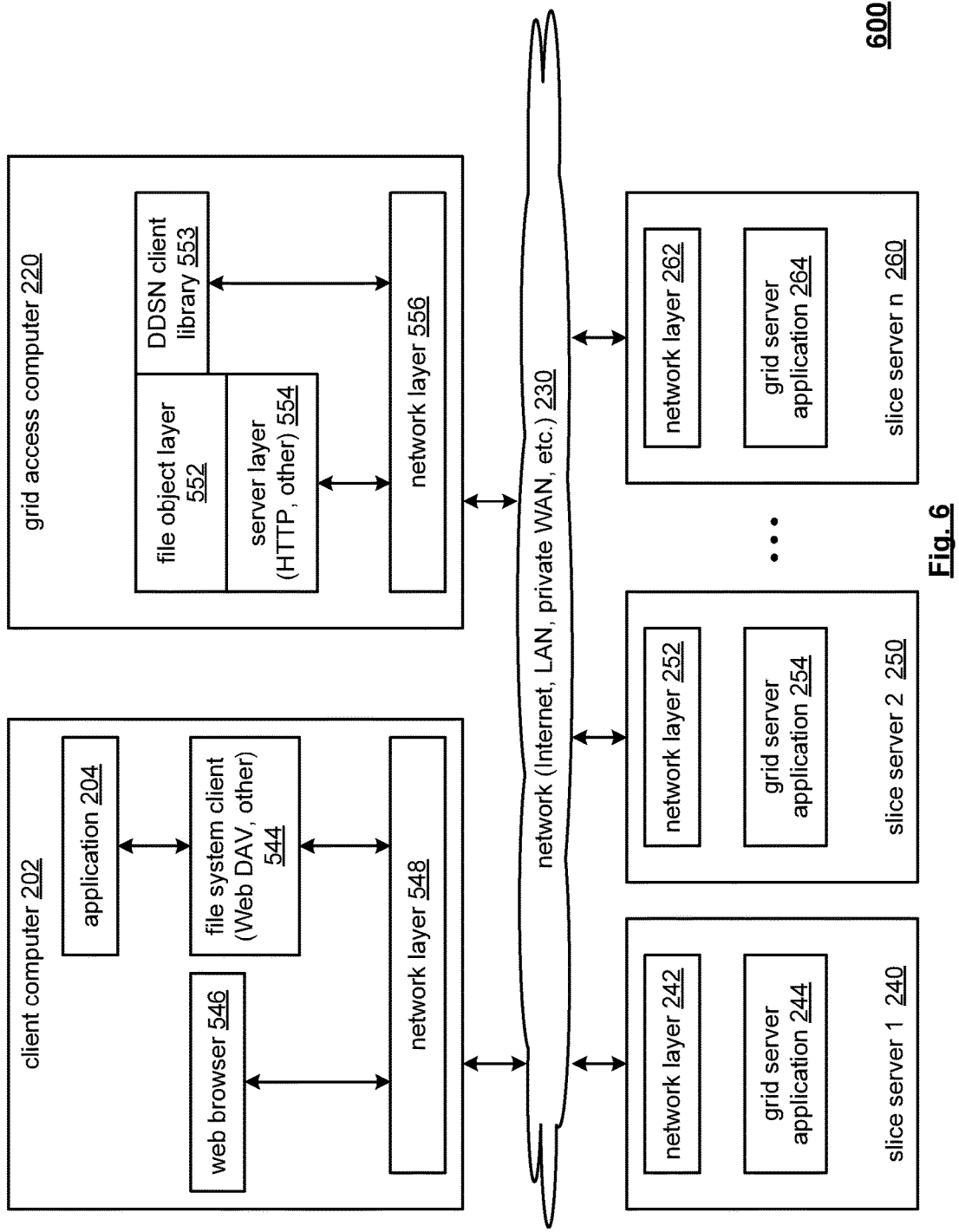
FIG. 6 is a block diagram illustrating the interoperation of different software components used to access a dispersed data storage network using the disclosed File-Object interface and constructed in accordance with an embodiment of the disclosed invention.

Returning to the Figures, and to FIG. 6 in particular, a distributed computer system implementing a DDSN 600 is depicted. The illustrated system includes a client/user computer 202, a grid access computer 220 and some number of slice servers 240, 250, and 260. Within the client computer 202 an application program 204 accesses a networked file system 544, such as WebDAV, NFS, or some other networked file system. The networked file system 544 will issue commands to a network layer 212 operating on the client computer 548. Alternatively, a web browser 546 accessing a web page published by the grid access computer 220 may directly issue commands to the network layer 212.

The network layer 212 issues packets to the network 230 to carry out any received commands. File system commands will be routed to the grid access computer 220 where they will be processed by a network layer 224 operating thereon. Packets received by the network layer 224 may be passed to Server Layer 554, which, for file system related packets, will examine the packets and, based on the contents of the packets, issue commands to File-Object Layer 552. Server Layer 554 examines each packet passed to it by Network Layer 224 and, based on the requesting file system, e.g., NFS, WebDAV, etc., as well as the specific type of packet, will issue a command to the File-Object Layer 552. The File-Object Layer 552 presents a limited interface to the Server Layer 554, and effectively implements a virtual file system for nearly any type of networked file system for which an interface exists.

The File-Object Layer 552 issues commands to the Access Application 553, which implements an information dispersal algorithm in accordance with the received commands. For example, if a read command is received by the File-Object Layer 552, the Access Application 553 will issue network packets for transmission by Network Layer 224 to Slice Servers 240, 250, and 260 to carry out the read.

Figure 7:
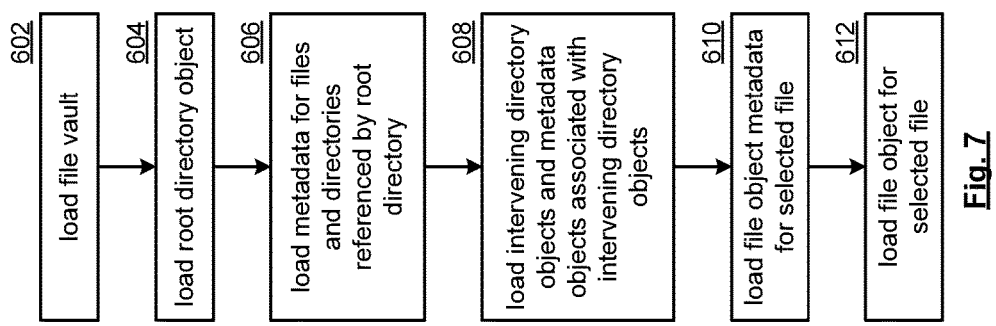
FIG. 7 is a flowchart illustrating at a high level how a file object is loaded by a dispersed data storage network constructed in accordance with an embodiment of the disclosed invention.

FIG. 7 is a high-level flowchart illustrating how a file might be read using DFS. To start accessing DFS, a grid access computer, client computer, or some other device seeking access to the DDSN through DFS, could load a particular file vault associated with the desired DDSN in step 602. In step 604, the root directory object would be loaded from the DDSN. Steps 602 and 604 would generally be performed on initialization, and would not need to be performed again. On the first access of a particular file vault, step 606 would be executed, and metadata associated with files and directories listed in the root directory would be loaded from the DDSN.

In step 608, intervening directory objects, meaning those between the desired file and the root directory of the vault, would be read, along with the metadata associated with the intervening directory objects in step 608. Once the home directory of the desired file has been opened, the file object metadata associated with the desired file is loaded in step 610, and the file object itself is loaded in step 612. The desired file may then be manipulated.

Figure 8A:
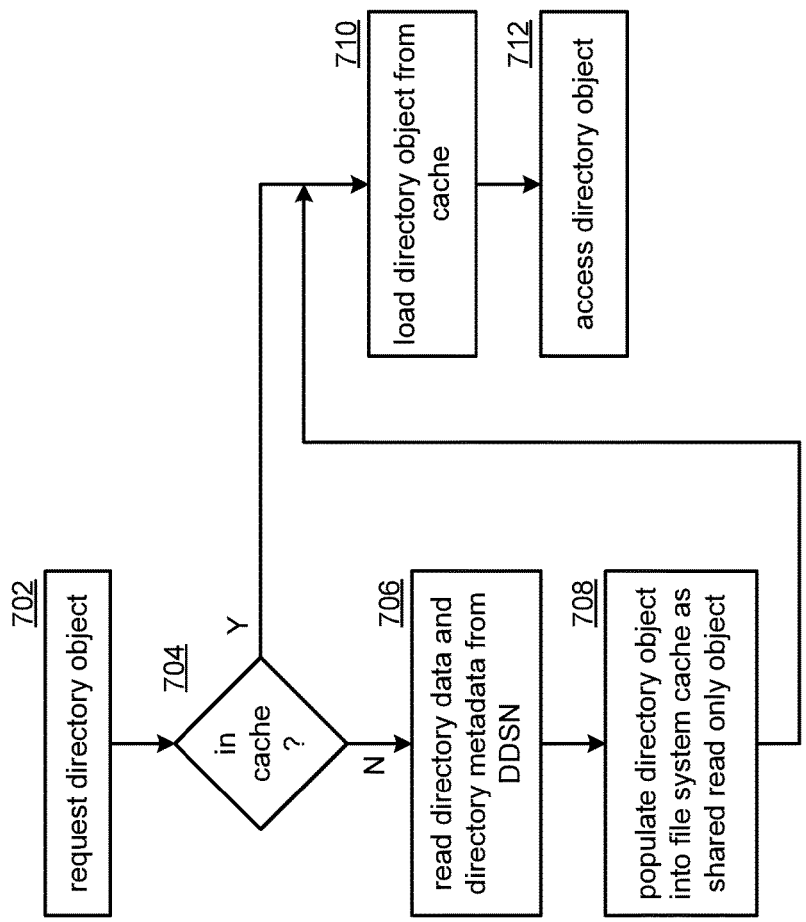
FIG. 8A is a flowchart illustrating how a directory object is loaded by a dispersed data storage network constructed in accordance with an embodiment of the disclosed invention.

FIG. 8A illustrates the process by which a directory object may be loaded into the file system cache and accessed. In step 702, a request is made for a particular directory object. This request could come from an application level program directly accessing DFS or a higher level file system interface. In step 704, a check is made to determine whether the requested directory object is resident within the file system cache. If it is, execution resumes at step 710. However, if it is not, the directory object and associated metadata object are read from the DDSN in step 706, and both are populated into the file system cache in step 708 as shared read only cache objects, meaning that any program may access the directory object and associated metadata object, but nether may be modified. In step 710, the directory object is loaded from the cache and accessed by the calling program in step 712.

Figure 8B:
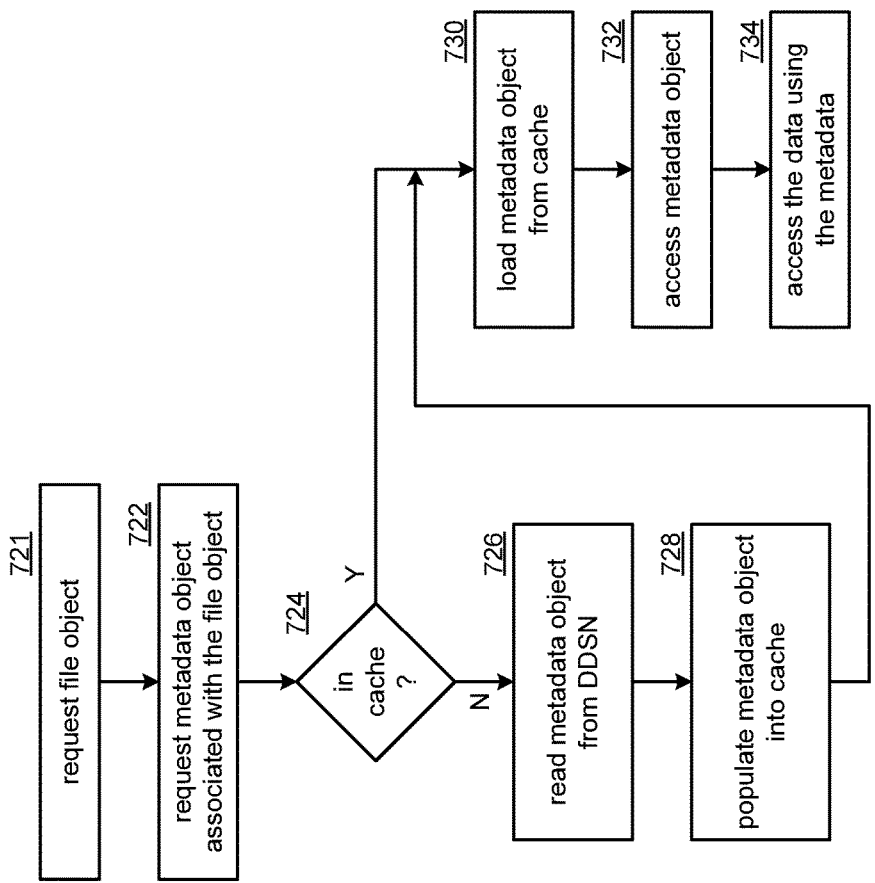
FIG. 8B is a flowchart illustrating how a file object is loaded by a dispersed data storage network constructed in accordance with an embodiment of the disclosed invention.

FIG. 8B illustrates the process by which a file object may be loaded into the file system cache and accessed. In step 721, a file object is requested. This request could also come for an application level program directly accessing DFS or a higher level file system interface. In step 722, a request is made for the metadata object associated with the desired file object. In step 724, a check is made to determine whether the requested metadata object is resident within the file system cache. If it is, execution resumes at step 730. However, If it is not, the metadata object is read from the DDS in step 726, and it is populated into the file system cache in step 728 as a shared read only cache object, meaning that any program may access the metadata object, but it may not be modified. In step 730, the metadata object is loaded from the cache and it is accessed by the calling program in step 732. In step 734, the requested file object may be accessed by the calling program through use of the file object identifier embedded within the metadata object.

Figure 9:
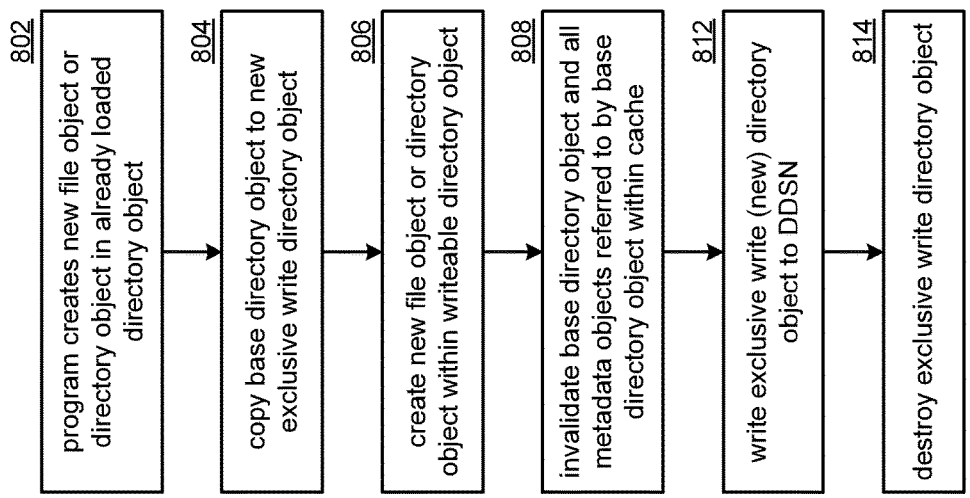
FIG. 9 is a flowchart illustrating the high level process of creating a file or directory object in accordance with an embodiment of the disclosed invention.

FIG. 9 illustrates how a file or directory could be created within an already loaded shared read only directory object. In step 802, a request is made to create a new file or directory within an already loaded directory. In step 804, the already loaded base directory object is copied into an identical exclusive write directory object. Other programs may continue to read the already loaded directory object from the file system cache. In step 806, the new file object or directory object is created within the exclusive write directory object. In step 808, the shared read only base directory object is invalidated within the file system cache along with metadata objects associated with any directory objects or file objects referred to by the base directory object. In step 812, the exclusive write directory object is written to the DDSN and, on confirmation of a successful write, destroyed within the file system cache in step 814.

Figure 10A:
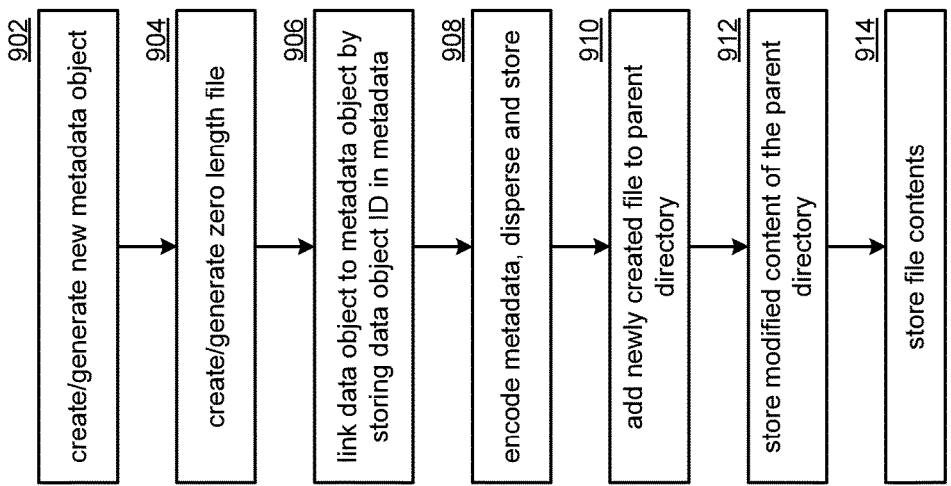
FIG. 10A is a flowchart illustrating the details of creation of a file object in accordance with an embodiment of the disclosed invention.

The procedure to create a virtual dispersed file on a DDSN is described in FIG. 10A. First, in step 902, an object representing metadata for the newly created file is generated and initialized with the metadata values, such as, for example, creation time. Then, in step 904, a new data object is created representing the content of the file. As the file is new, the content is a zero length file object. In step 906, the two objects generated above are linked to each other by embedding the object ID of the data object in the metadata object. In step 908, these two objects are encoded using an information dispersal algorithm, segmented, dispersed and stored on the DDSN. Then, in step 910, the newly created file object is added to the parent directory object, and the metadata object of the parent directory is modified to reflect the new size of the parent directory. In step 912, the modified directory object and metadata object of the parent directory are segmented, dispersed and stored on the DDSN. Finally, in step 914, the contents of the file are stored to DDSN.

Figure 10B:
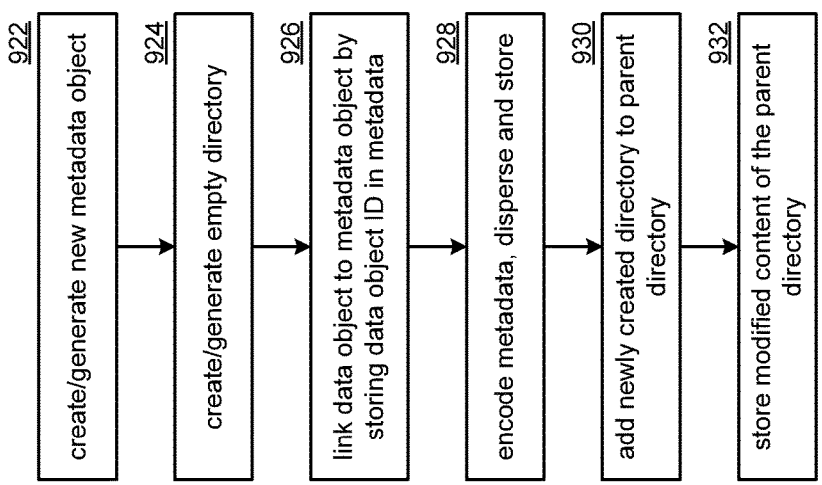
FIG. 10B is a flowchart illustrating the creation of a directory object in accordance with an embodiment of the disclosed invention.

The procedure to create a virtual dispersed directory on a DDSN is described in FIG. 10B. First, in step 922, an object representing metadata for the newly created directory is generated and initialized with the metadata values, such as, for example, creation time. Then, in step 924, a new data object is created representing the content of the directory. As the directory is new, it will be an empty list of files and directories contained within the directory. In step 926, the two objects generated above are linked to each other by embedding the object ID of the directory object in the metadata object. In step 928, these two objects are segmented and dispersed using an information dispersal algorithm, and stored on the DDSN. Then, in step 930, the newly created directory object is added to the parent directory object, and the metadata object of the parent directory is modified to reflect the new size of the parent directory. Finally, in step 932, the modified directory object and metadata object of the parent directory are segmented, dispersed and stored on the DDSN.

Another feature of the disclosed file system is the ability to store variable sized data segments to a DDSN, as opposed to fixed sized blocks or segments. In particular, the disclosed file system segments a collection of data into one or more data segments. These data segments may be of the same size. Alternatively, a segmentation strategy may be employed whereby variable sized data segments are created. One strategy would be to use relatively small data segments near the beginning of a collection of data, and to increase the size of the data segments as data stored later within the collection of data was processed. This would allow for quicker access to data stored near the beginning of a collection of data with the offsetting disadvantage of increased network traffic due to additional requests to the DDSN.

The segmentation strategies described above would be particularly well suited for use when accessing a streaming media presentation. The smaller segment size used for the initial portions of the presentation would be accessed quickly, allowing the stream to start faster and a buffer of media content to be created. Later portions of the presentation would be accessed using larger segment sizes, thereby minimizing network traffic as the remainder of the presentation was viewed.

While segmenting a collection of data is generally desirable as segmentation enhances random access performance within a collection of data, certain collections of data, such as file system objects, file system metadata objects, and other collections of data are not of use unless the entire collection of data in question is available. In such a case, a flag may be associated with a collection of data indicating that the collection of data should not be segmented. This flag may be exported to a DFS user or the flag may be for use only by the DFS itself.

Figure 11A:
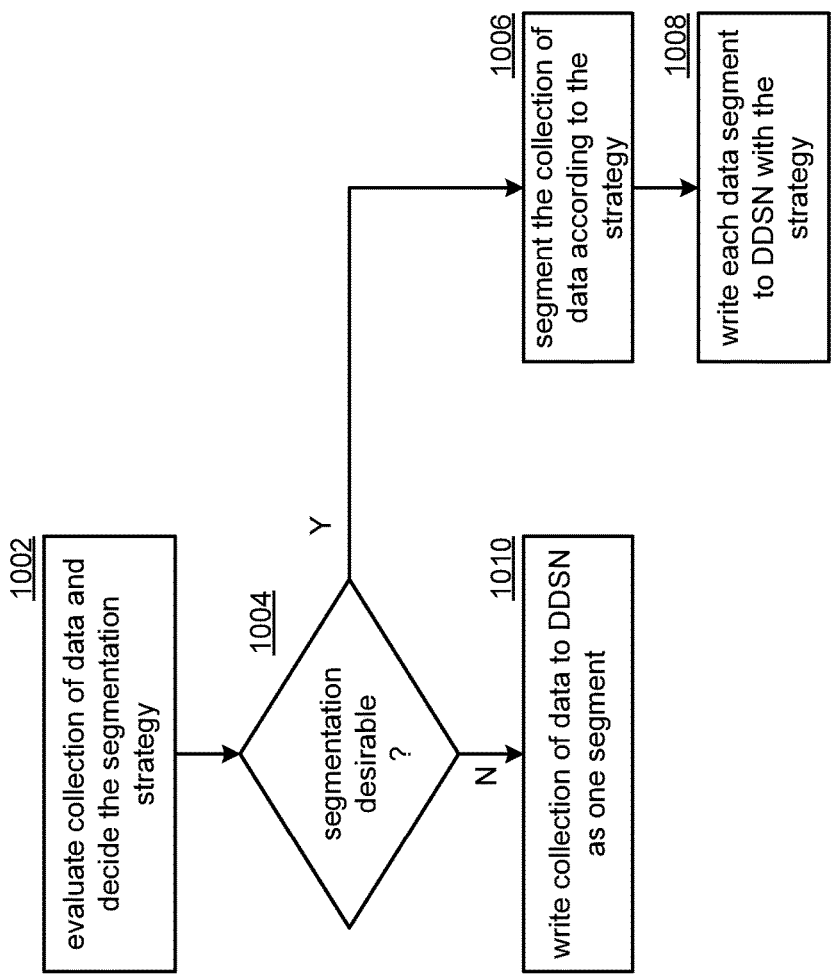
FIG. 11A is a flowchart illustrating the segmenting of a file or directory object before writing, in accordance with an embodiment of the disclosed invention.

FIG. 11A shows the segmentation of a file, directory or other collection of data before it is stored on the DDSN. In step 1002, the data to be stored is evaluated on various criteria to determine the best segmentation strategy. This could include size, need for random access, type of access or client, or other criteria that could affect performance or storage. Based on these criteria, it is determined whether segmentation is desirable in step 1004. If segmentation is not desirable, such as, for example, for a metadata object, the collection of data is written to the DDSN as one segment in step 1010. However, if segmentation is desirable, the collection of data is segmented according to the selected segmentation strategy in step 1006. In step 1008, each data segment is written to the DDSN.

Figure 11B:
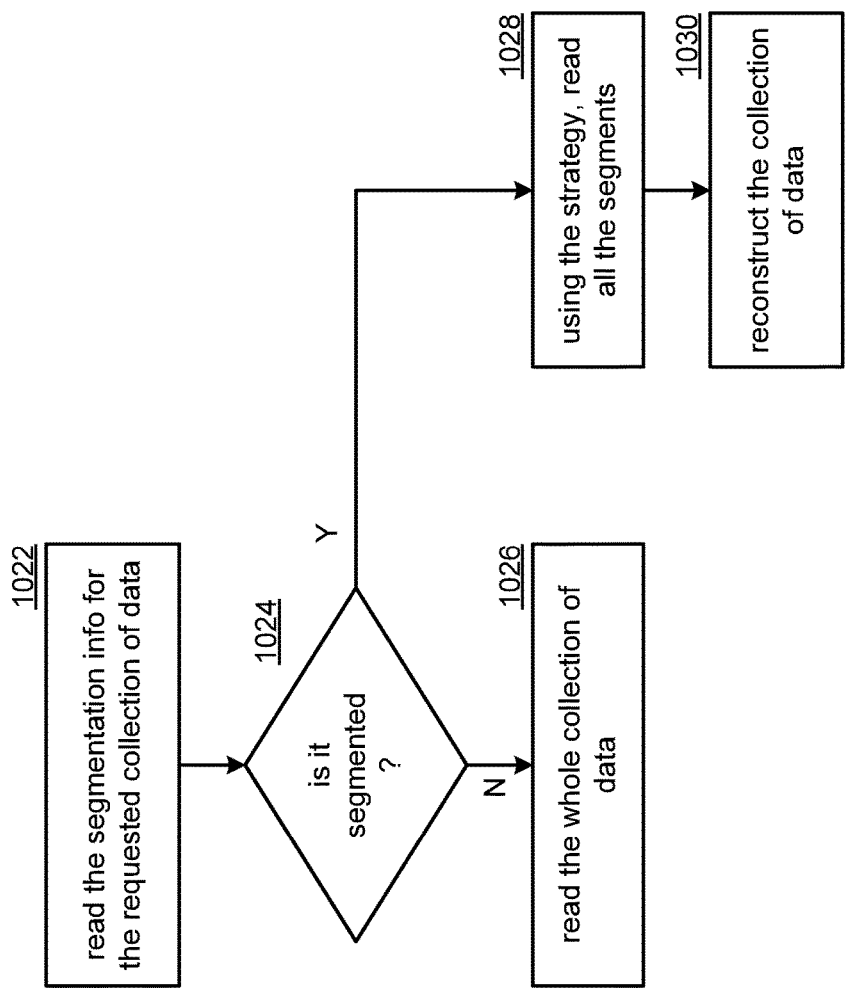
FIG. 11B is a flowchart illustrating the reconstructing of segmented data during a read, in accordance with an embodiment of the disclosed invention.

FIG. 11B shows the reconstitution of segmented data when it is retrieved from the DDSN. In step 1022, the segmentation information for the requested collection of data is retrieved, and a determination of whether or not the collection of data is segmented is made in step 1024. If the collection of data is not segmented, the entire collection is read in step 1026. However, if the collection of data is segmented, all of the segments are retrieved in accordance with the segmentation information in step 1028. In step 1030, the collection of data is reconstructed, and returned.

Detailed Description of the Integrated Client Adapted for Use with a Dispersed Data Storage Network The integrated client disclosed herein is especially adapted to directly access a plurality of slice servers without the use of grid access computer or other intermediary. The disclosed integrated client makes use of the registry disclosed in the application titled "Systems, Methods, and Apparatus for Identifying Accessible Dispersed Digital Storage Vaults Utilizing a Centralized Registry," which was previously incorporated by reference. On startup, the integrated client contacts the registry, from which it receives descriptions of vaults, or virtual DDSNs, that it can access. In one embodiment, the integrated client will allow access to the enumerated vaults using syntax similar to that used with file transfer protocol.

Figure 12:
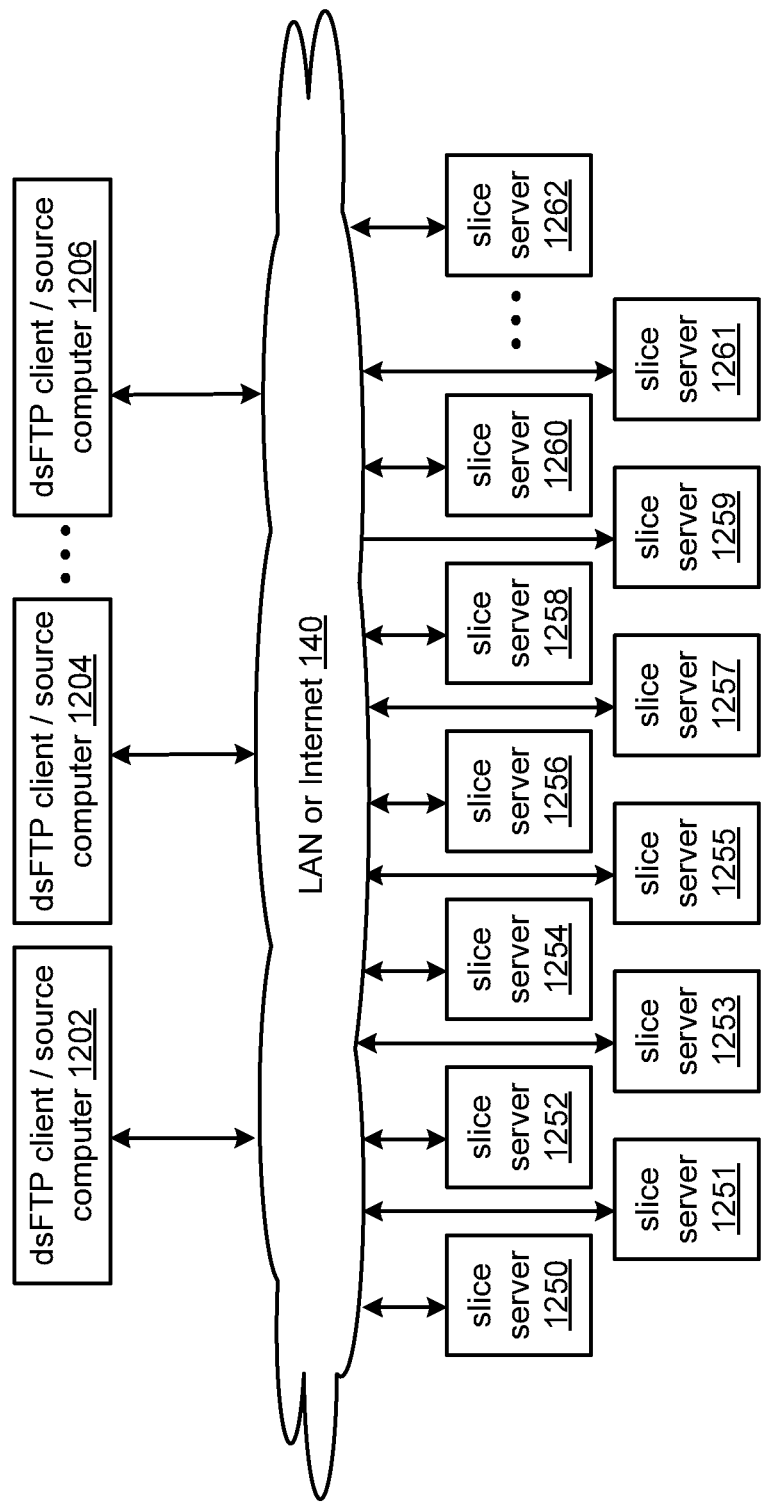
FIG. 12 is a network diagram of a dispersed data storage network constructed in accordance with an embodiment of the disclosed invention.

Turning to the Figures, and to FIG. 12 in particular, a distributed computer system implementing a dispersed data storage network is shown. An arbitrary number of slice servers 1250-1262 store data slices sent to them by networked source computers 1202, 1204, and 1206. Each of the source computers 1202, 1204, and 1206 is an integrated client capable of directly accessing the slice servers 1250-1262.

Figure 13:
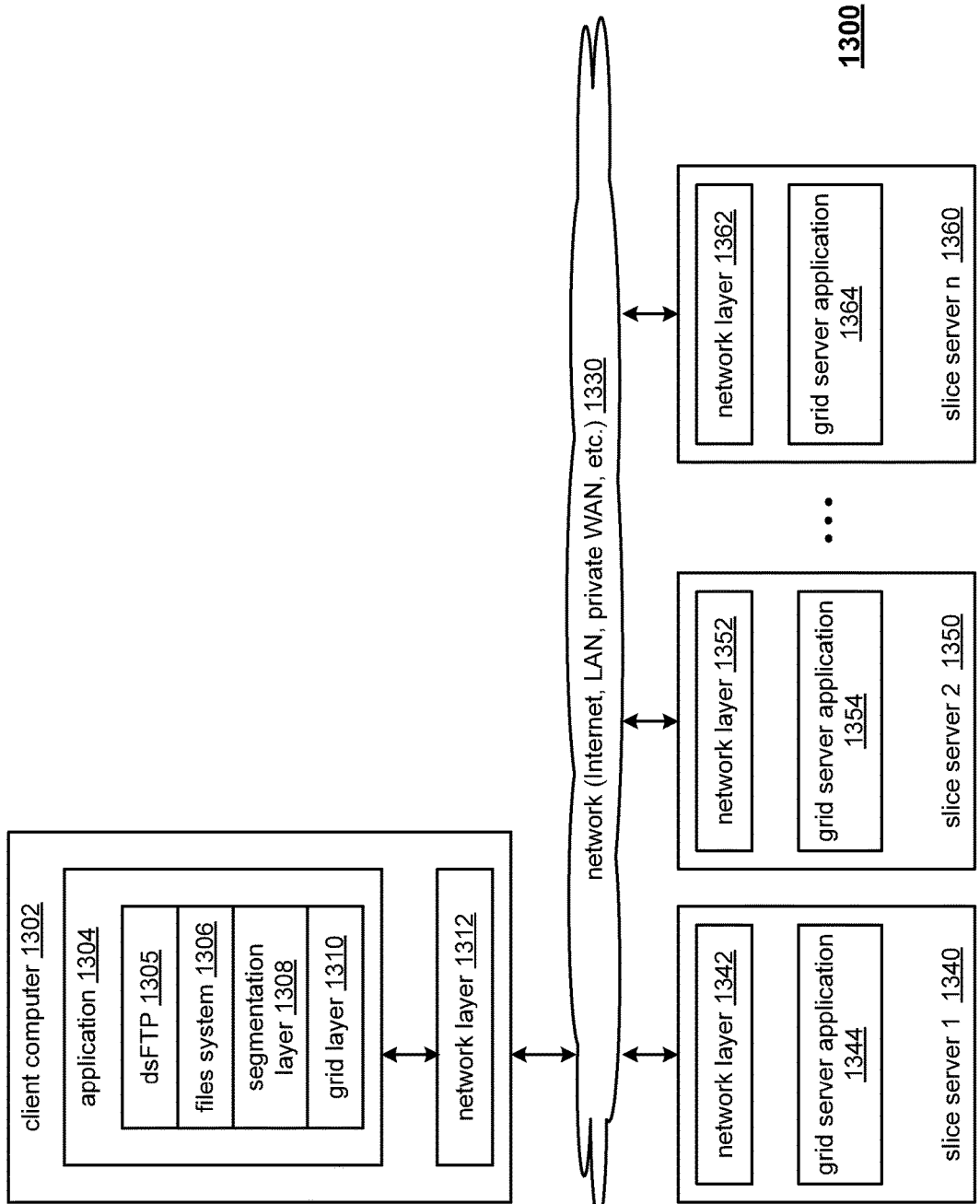
FIG. 13 is a block diagram illustrating the interoperation of different software components used to implement a dispersed data storage network constructed in accordance with an embodiment of the disclosed invention.

FIG. 13 illustrates a distributed computer system implementing a dispersed data storage network 1300. The illustrated system consists of a client/user computer 1302 and some number of slice servers 1340, 1350, and 1360. Within the client computer 1302, an application program 1304 utilizes an integrated DDSN client to access data stored on the slice servers 1340, 1350, and 1360. As depicted, the integrated client incorporates a FTP layer 1305 for interpreting file transfer protocol commands. The FTP layer 1305 accesses a file system 1306, which accesses a segmentation layer 1308. The file system is responsible for maintaining information about a particular file, as explained above. The segmentation layer 1308 is responsible for applying an information dispersal algorithm to read or written data; the information dispersal algorithm will either assemble a data segment from a number of data slices read from the DDSN, or slice a data segment into multiple data slices to be written to the DDSN. The segmentation layer accesses a grid layer 1310, which formulates network messages for the network layer 1312 and receives messages from the network layer 1313, which may be part of the operating system that the integrated DDSN client operates on, or may be implemented as a firmware module, or some other means of providing network access.

The client computer 1302 communicates with the slice servers 1340, 1350, and 1360 over a network 1330. The network 1330 can be any type of network, such as a local area network, a private wide area network, or the Internet. Each slice server 1340, 1350, and 1360 includes a network layer 1342, 1352, and 1362, which is part of the operating system that the slice server utilizes, as well as a grid server application 1344, 1354, and 1364. The grid server application 1344, 1354, and 1364 is responsible for managing data slices stored by the slice server 1340, 1350, and 1360.

In one embodiment, the disclosed integrated client utilizes File Transfer Protocol ("FTP") syntax. It should be noted that while FTP syntax is utilized, the FTP network protocol is not; instead, a protocol specific to the Cleversafe DDSN is utilized. For example, a user could issue the command "stor filename.txt," which would upload a file called "filename.txt" to the active vault. FTP syntax was selected as it provides a widely known syntax for users and programmers. The complete FTP syntax can be found in Request for Comment 959 of the Network Working Group, which is hereby incorporated by reference in its entirety.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method for execution by one or more processing modules of a computing device of a dispersed data storage network (DDSN), the DDSN having storage resources including a plurality of storage units, the method comprises:
   receiving a data transaction request regarding a data file;
   in response to the data transaction request, generating a first set of access requests regarding a first set of encoded data slices and the plurality of storage units, wherein a first data segment of the data file is encoded into the first set of encoded data slices, wherein the first set of encoded data slices includes "n" number of encoded data slices, and wherein a decode threshold number of encoded data slices of the first set of encoded data slices is needed to recover the first data segment;
   generating a second set of access requests regarding a second set of encoded data slices and the plurality of storage units, wherein a second data segment of the data file is encoded into the second set of encoded data slices, wherein the second set of encoded data slices includes the "n" number of encoded data slices, and wherein the decode threshold number of encoded data slices of the second set of encoded data slices is needed to recover the second data segment;
   grouping the first set of access requests and the second set of access requests to produce a set of combined access requests; and
   sending the set of combined access requests, in a single message, for processing by other devices of the DDSN including the plurality of storage units.

2. The method of claim 1 further comprises:
   generating the first set of access requests as a set of write requests for writing the first set of encoded data slices to the plurality of storage units; and
   generating the second set of access requests as a set of write requests for writing the second set of encoded data slices to the plurality of storage units.

3. The method of claim 2 further comprises:
   generating a first write request of the first set of access requests;

generating a second write request of the second set of access requests; and combining the first write request and the a second write request into a first combined request of the set of combined access requests.

4. The method of claim 1 further comprises:

generating the first set of access requests as a set of read requests for reading the first set of encoded data slices from the plurality of storage units; and generating the second set of access requests as a second set of read requests for reading the second set of encoded data slices from the plurality of storage units.

5. The method of claim 1 further comprises:

generating the first set of access requests such that each access request of the first set of access requests includes a first data source identifier that is based on a vault identifier; and generating the second set of access requests such that each access request of the second set of access requests includes a second data source identifier that is also based on the vault identifier.

6. The method of claim 5 further comprises:

generating the first set of access requests such that the first data source identifier further includes a first random number; and generating the second set of access requests such that the second data source identifier includes the first random number.

7. The method of claim 1 further comprises:

when the first set of access requests corresponds to a set of write requests, affiliating a write transaction with the first set of access requests such that, when at least a decode threshold number of access requests of the first set of access requests is not successfully executed, the write transaction is rolled back.

8. The method of claim 1 further comprises:

when the data transaction request corresponds to a set of write requests:

determining a segmenting strategy regarding the data file; and segmenting the data file in accordance with the segmenting strategy to produce one or more data segments that includes the first data segment and the second data segment.

9. A computer comprises:

a network port for coupling to a dispersed data storage network (DDSN); a memory comprising instructions for a client program; and a processor operably coupled to the network port and the memory, wherein the processor operates to execute the client program, the client program adapted to:

receive, via the network port, a data transaction request regarding a data file;

in response to the data transaction request, generate a first set of access requests regarding a first set of encoded data slices and a plurality of storage units of the DDSN, wherein a first data segment of the data file is encoded into the first set of encoded data slices, wherein the first set of encoded data slices includes "n" number of encoded data slices, and wherein a decode threshold number of encoded data slices of the first set of encoded data slices is needed to recover the first data segment;

generate a second set of access requests regarding a second set of encoded data slices and the plurality of storage units, wherein a second data segment of the data file is encoded into the second set of encoded data slices, wherein the second set of encoded data slices includes the "n" number of encoded data slices, and wherein the decode threshold number of encoded data slices of the second set of encoded data slices is needed to recover the second data segment;

group the first set of access requests and the second set of access requests to produce a set of combined access requests; and send, via the network port, the set of combined access requests in a single message, for processing by other devices of the DDSN including the plurality of storage units.

10. The computer of claim 9, wherein the client program is further adapted to:

generate the first set of access requests as a set of write requests for writing the first set of encoded data slices to the plurality of storage units; and generate the second set of access requests as a set of write requests for writing the second set of encoded data slices to the plurality of storage units.

11. The computer of claim 10, wherein the client program is further adapted to:

generate a first write request of the first set of access requests;

generate a second write request of the second set of access requests; and combine the first write request and the a second write request into a first combined request of the set of combined access requests.

12. The computer of claim 9, wherein the client program is further adapted to:

generate the first set of access requests as a set of read requests for reading the first set of encoded data slices from the plurality of storage units; and generate the second set of access requests as a second set of read requests for reading the second set of encoded data slices from the plurality of storage units.

13. The computer of claim 9, wherein the client program is further adapted to:

generate the first set of access requests such that each access request of the first set of access requests includes a first data source identifier that is based on a vault identifier; and generate the second set of access requests such that each access request of the second set of access requests includes a second data source identifier that is also based on the vault identifier.

14. The computer of claim 13, wherein the client program is further adapted to:

generate the first set of access requests such that the first data source identifier further includes a first random number; and generate the second set of access requests such that the second data source identifier includes the first random number.

15. The computer of claim 9, wherein the client program is further adapted to:

when the first set of access requests corresponds to a set of write requests, affiliate a write transaction with the first set of access requests such that, when at least a decode threshold number of access requests of the first set of access requests is not successfully executed, the write transaction is rolled back.

16. The computer of claim 9, wherein the client program is further adapted to:

when the data transaction request corresponds to a set of write requests:

determine a segmenting strategy regarding the data file; and segment the data file in accordance with the segmenting strategy to produce one or more data segments that includes the first data segment and the second data segment.

\* \* \* \* \*